(12) United States Patent
Rafi et al.

(10) Patent No.: US 7,986,926 B2
(45) Date of Patent: Jul. 26, 2011

(54) INTEGRATING AN FM TRANSMITTER INTO A CELLULAR TELEPHONE

(75) Inventors: Aslamali A. Rafi, Austin, TX (US); Dan B. Kasha, Seattle, WA (US)

(73) Assignee: Silicon Laboratories Inc., Austin, TX (US)

( * ) Notice: Subject to any disclaimer, the term of this patent is extended or adjusted under 35 U.S.C. 154(b) by 928 days.

(21) Appl. No.: 11/528,051

(22) Filed: Sep. 27, 2006

(65) Prior Publication Data
US 2008/0076363 A1   Mar. 27, 2008

(51) Int. Cl.
*H04B 1/04* (2006.01)
(52) U.S. Cl. ......................... 455/118; 455/93
(58) Field of Classification Search .............. 455/91, 455/93, 118, 323, 333, 334, 337–341, 556.1
See application file for complete search history.

(56) References Cited

U.S. PATENT DOCUMENTS

| | | | |
|---|---|---|---|
| 5,319,716 A * | 6/1994 | McGreevy ...................... 381/79 |
| 7,203,511 B2 * | 4/2007 | Trachewsky et al. ......... 455/522 |
| 2004/0229592 A1 * | 11/2004 | Matsui et al. ................. 455/333 |
| 2005/0122754 A1 * | 6/2005 | Nielsen ......................... 363/132 |
| 2005/0130700 A1 | 6/2005 | Gardenfors et al. |
| 2005/0153677 A1 | 7/2005 | Vorenkamp et al. |
| 2006/0035619 A1 | 2/2006 | Hallivuori et al. |
| 2006/0084383 A1 * | 4/2006 | Ibrahim et al. ............... 455/41.2 |
| 2006/0128347 A1 * | 6/2006 | Piriyapoksombut et al. . 455/333 |
| 2006/0199562 A1 | 9/2006 | Taylor |
| 2007/0018735 A1 * | 1/2007 | Sirito-Olivier ................. 331/16 |

OTHER PUBLICATIONS

US Patent Office, International Search Report and Written Opinion for corresponding International Application No. PCT/US2007/020504, 8 pages, Mar. 31, 2008.

* cited by examiner

*Primary Examiner* — Nhan Le
(74) *Attorney, Agent, or Firm* — Trop, Pruner & Hu, P.C.

(57) ABSTRACT

A system includes a cellular radio and an FM transmitter that are fabricated in the same semiconductor. The FM transmitter includes at least one mixer, a filter and an antenna tuning network. The mixer(s) translate an intermediate carrier frequency of an input signal to generate a second signal that has an FM carrier frequency. The filter removes spectral energy from the second signal to generate a third signal. The antenna tuning network is separate from the filter and produces a fourth signal to drive an antenna in response to the third signal.

5 Claims, 7 Drawing Sheets

INTEGRATING AN FM TRANSMITTER INTO A CELLULAR TELEPHONE

BACKGROUND

The invention generally relates to integrating an FM transmitter into a cellular telephone and more particularly relates to an FM transmitter that has features that facilitate integration of the transmitter into a cellular telephone.

A modern cellular telephone may have the capability of playing digital music files (MP3 files, for example). Due to the limited capability of the cellular telephone's speaker system, the telephone may contain a low power frequency modulation (FM) transmitter for purposes of communicating the digital music file content over an FM channel to a nearby stereo system. However, a potential challenge with incorporating an FM transmitter into a cellular telephone is that out of band spectral energy that is generated by the FM transmitter may encroach into the receive channels of the telephone, thereby potentially impairing the telephone's ability to receive an incoming signal.

As a more specific example, for the Global System for Mobile communications (GSM) standard, the RF signal that is received by the cellular telephone may have a relatively small magnitude, such as about −108 dBm. Any spectral energy (such as out of band spectral energy that is generated by the FM transmitter, for example) that appears in the GSM receive channel must be smaller than the noise floor of the receive channel, which may be approximately −117 dBm. Therefore, stringent requirements may be placed on the out of band spectral energy that is transmitted by the FM transmitter.

Thus, there is a continuing need for better ways to integrate an FM transmitter and a cellular telephone.

SUMMARY

In an embodiment of the invention, a transmitter includes at least one mixer, a filter and an antenna tuning network. The mixer(s) translate a frequency of an input signal to generate a second signal. The filter is separate from the antenna tuning network and removes spectral energy from the second signal to generate a third signal. The antenna tuning network produces a fourth signal to drive an antenna in response to the third signal.

In another embodiment of the invention, a system includes a cellular radio and an FM transmitter that are both fabricated in the same semiconductor die. The FM transmitter includes at least one mixer, a filter and an antenna tuning network. The mixer(s) translate an intermediate carrier frequency of an input signal to generate a second signal that has an FM carrier frequency. The filter removes spectral energy from the second signal to generate a third signal. The antenna tuning network is separate from the filter and produces a fourth signal to drive an antenna in response to the third signal.

In yet another embodiment of the invention, a method includes translating a frequency of an input signal to generate a second signal. The second signal is communicated through a filter to remove spectral energy from the second signal to generate a third signal. The third signal is communicated to an antenna tuning network, which is separate from the filter to produce a fourth signal to drive an antenna.

Advantages and other features of the invention will become apparent from the following drawing, description and claims.

DETAILED DESCRIPTION

Figure 1:
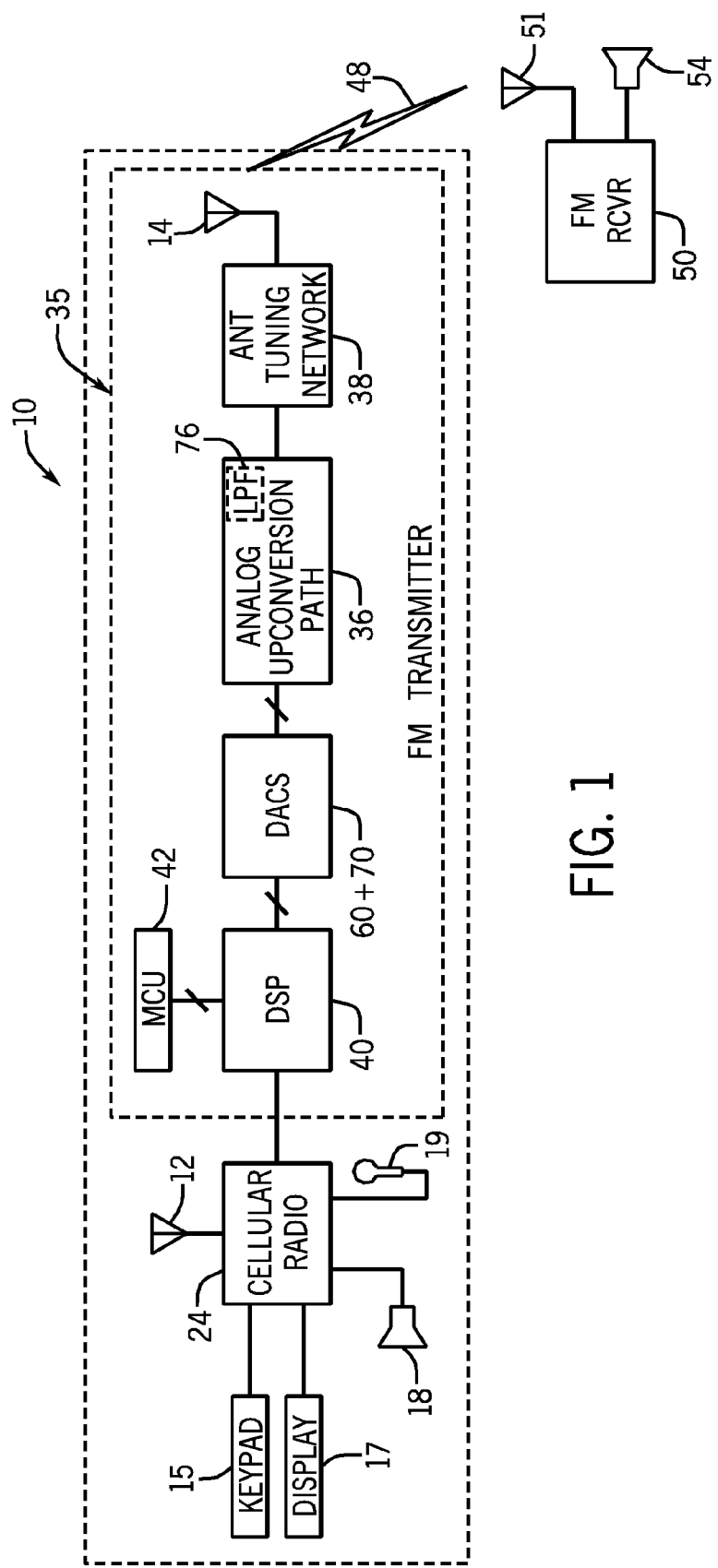
FIG. 1 is a schematic diagram of a wireless communication system according to an embodiment of the invention.

Referring to FIG. 1, in accordance with an embodiment of the invention, a cellular radio 24 and a frequency modulation (FM) transmitter 35 are part of a cellular telephone 10. Thus, the cellular radio 10 and FM transmitter 35 are located inside the same telephone housing. The cellular radio 24 and FM transmitter 35 may be fabricated on separate semiconductor dies or may be fabricated on the same semiconductor die, depending on the particular embodiment of the invention. Furthermore, the cellular radio 24 and FM transmitter 35 may be part of the same semiconductor packet, or "chip," or may be part of different semiconductor packages, depending on the particular embodiment of the invention. Additionally, in some embodiments of the invention, the FM transmitter 35 may be part of a semiconductor package that includes FM and AM receive paths (which may be disabled). Thus, many variations are possible and are within the scope of the appended claims.

The FM transmitter 35 may be constructed to transmit (via its FM antenna 14) an FM signal over a low power FM link 48 to an FM receiver 50. In this regard, the FM receiver 50 may receive an RF FM signal (via its antenna 51) from the low power FM link 48 and produce audio content (encoded in the RF signal) over its speaker system 54 in response to the received FM signal. As an example, in accordance with some embodiments of the invention, the cellular telephone 10 may function as an MP3 player, which is capable of downloading, storing and playing (via the FM receiver 50 and speaker system 54) MP3-based digital music files.

The FM transmitter 35 has features that minimize distortion that otherwise may be introduced into the receive channels of the cellular telephone 10 due to the transmissions by the transmitter 35; and the FM transmitter 35 has a design that minimizes its die area. As described further below, the FM transmitter 35 includes an analog upconversion path 36, which includes a low pass filter (LPF) 76 that significantly filters out spectral energy from the transmitted FM signal, which would otherwise fall outside of the FM band. An antenna tuning network 38 of the FM transmitter 35 drives the antenna 14 in response to the filtered signal that is provided by the LPF 76. Due to the filtering of the out of band spectral energy by the LPF 76, the Q factor of the antenna tuning network 38 may be kept relatively low (a Q factor of approximately 10, for example), while still minimizing the spectral energy that the FM transmitter 35 introduces into the receive channels of the cellular telephone 10.

The cellular telephone 10 may have numerous different designs, one of which is depicted for purposes of example in FIG. 1. The cellular radio 24 is constructed to communicate with a cellular network via at least one antenna 12. The FM transmitter 35 includes a digital signal processor (DSP) 40, which may, for example, convert a digital signal that is provided by the cellular radio 24 into an intermediate frequency (IF) signal. The DSP 40 provides the IF signal to digital-to-analog converters (DACs) 60 and 70, which provide analog signals to the analog upconversion path 36 that frequency translates the received IF signals into an RF signal. More specifically, the RF signal that is generated by the analog upconversion path 36 is communicated through an antenna tuning network 36 (of the FM transmitter 35) to the antenna 14.

A microcontroller unit (MCU) 42 of the FM transmitter 35 generally controls the overall operation of the transmitter 35. More specifically, the MCU 34 may control signal gains of the FM transmitter 35, as further described below.

Among its other features, the cellular telephone 10 may include a speaker system 18, a microphone 19, a keypad 15 and a display 17.

Figure 2:
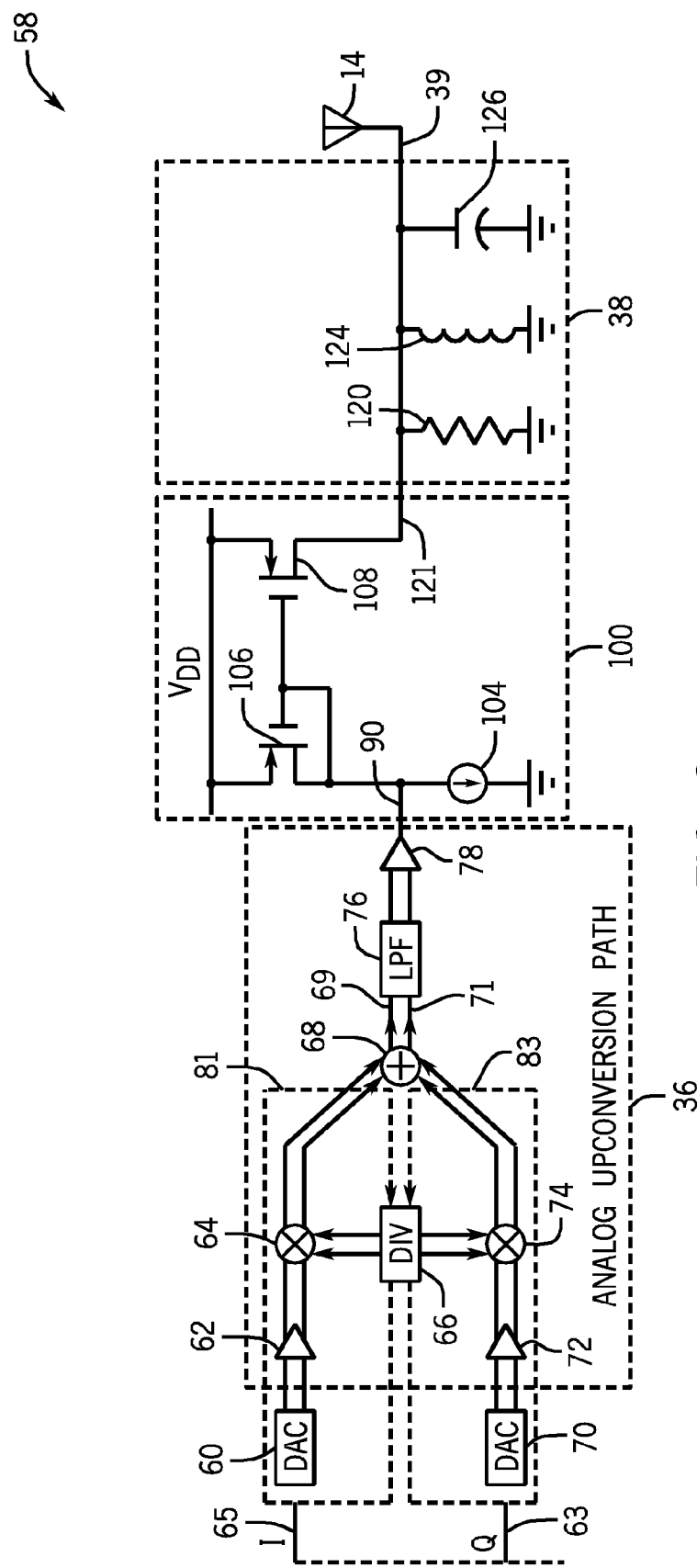
FIG. 2 is a schematic diagram of a signal processing path of the FM transmitter of FIG. 1 according to an embodiment of the invention.

FIG. 2 depicts an exemplary embodiment of a signal processing path 58 of the FM transmitter 35 in accordance with some embodiments of the invention. In some embodiments of the invention, the DACs 60 and 70 receive in-phase (called "I") and quadrature (called "Q") baseband signals, respectively, from the cellular radio 24 (see FIG. 1). The DACs 60 and 70 include digital input terminals 65 and 63, respectively.

The analog conversion path 36 translates the IF I and Q signals from IF to RF. More specifically, in accordance with some embodiments of the invention, the FM transmitter 35 includes an in-phase signal processing path 81 and a quadrature signal processing path 83. The in-phase signal processing path 81 includes the DAC 60 and an IF transconductor 62 that amplifies the analog signal that is provided by the DAC 60 and provides the amplified signal to a mixer 64. In a similar manner, the quadrature signal processing path 83 includes the DAC 70 and an IF transconductor 72 that amplifies the analog signal that is provided by the DAC 70 and provides the amplified signal to a mixer 74. In accordance with some embodiments of the invention, the IF transconductors 62 and 72 have the same design, which is discussed further below.

In accordance with some embodiments of the invention, the mixers 64 and 74 have the same design and are each square wave mixers that receive square wave mixing signals (provided by a frequency divider 66, for example) for purposes of translating the IF frequencies into RF frequencies. The square wave mixing signals that are provided to the mixers 64 and 74 are offset by 90°, pursuant to the in-phase/quadrature mixing.

As a result of the square wave mixing, the harmonics of the mixed signals may contain a considerable amount of out of band spectral energy. Thus, the FM signal that is provided by an adder 68 (that combines the mixed signals that are provided by the mixers 64 and 74) may contain a significant amount of out of band spectral energy.

More specifically, in accordance with some embodiments of the invention, the LPF 76 receives the FM signal from the mixers 64 and 74 and produces an RF signal that has a significantly reduced spectral content outside of the FM band. An RF transconductor 78 receives the filtered signal from the LPF 76 to produce an amplified RF signal that is communicated to a current driver 100.

The current driver 100 forms a transition between the high power side (containing the antenna tuning network 38) and the lower power side (the portion of the signal processing path 58 upstream of the current driver 100) of the FM transmitter 35. As depicted in FIG. 2, in some embodiments of the invention, the current driver 100 may include a transimpedance amplifier that is formed from a current mirror. A resistor 120 that is coupled to an output terminal 121 of the current mirror converts the output current from the current mirror into a voltage that drives the antenna tuning network 38.

More specifically, the current driver 100 may include a current sink 104 that is coupled to an input node 90 of the driver 100. The input node 90 is coupled to the output terminal of the RF transconductor 78 and is also coupled to the drain terminal of a p-channel metal-oxide-semiconductor field-effect-transistor (PMOSFET) 106. The drain and the gate terminals of the PMOSFET 106 are coupled together, and the source terminal of the PMOSFET 106 is coupled to a voltage supply (called "$V_{DD}$"). Another PMOSFET 108 has its gate terminal connected to the gate terminal of the PMOSFET 106. The source terminal of the PMOSFET 108 of the current driver 100 is coupled to the $V_{DD}$ supply voltage, and the drain terminal of the PMOSFET 108 is coupled to the output terminal 121.

As shown in FIG. 2, in accordance with some embodiments of the invention, the antenna tuning network 38 may be formed from a parallel combination of an inductor 124 and a capacitor 126 that are coupled between an output terminal 39 of the output tuning network 38 and ground. The output terminal 39 is coupled to the antenna 14. The resistor 120 may be coupled in parallel with the inductor 124 and capacitor 126.

Figure 3:
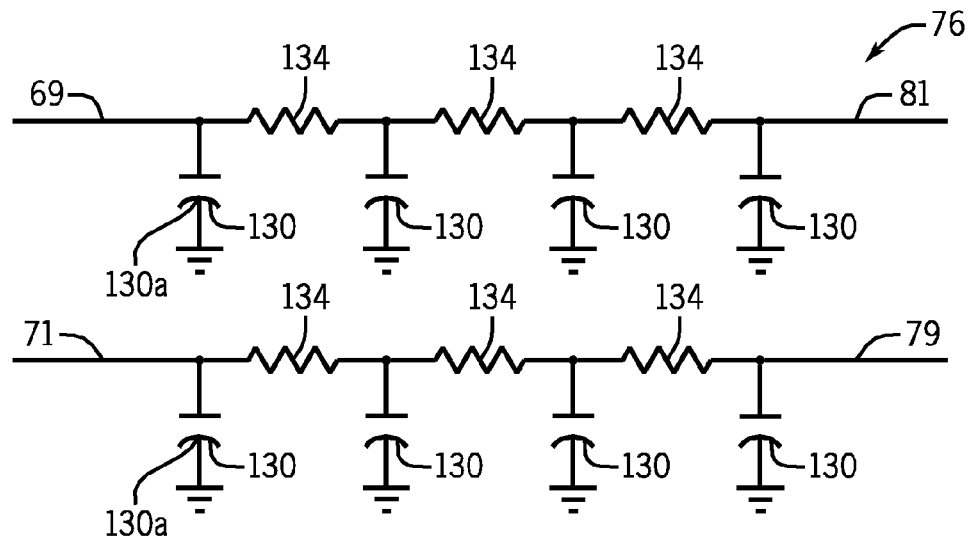
FIG. 3 is a schematic diagram of a filter of the FM transmitter according to an embodiment of the invention.

Referring to FIG. 3, in accordance with some embodiments of the invention, the LPF 76 may be a passive RC ladder-type filter that receives and provides differential signals. In this regard, the LPF 76 may be formed from capacitors 130 and resistors 134 that are arranged in a low pass filter arrangement between input terminals 69 and 71 of the LPF 765 and the LPF's output terminals 81 and 79, respectively. It is noted that in other embodiments of the invention, other topologies may be used for the LPF 76, and these other topologies may include active filters, in accordance with embodiments of the invention.

Figure 4:
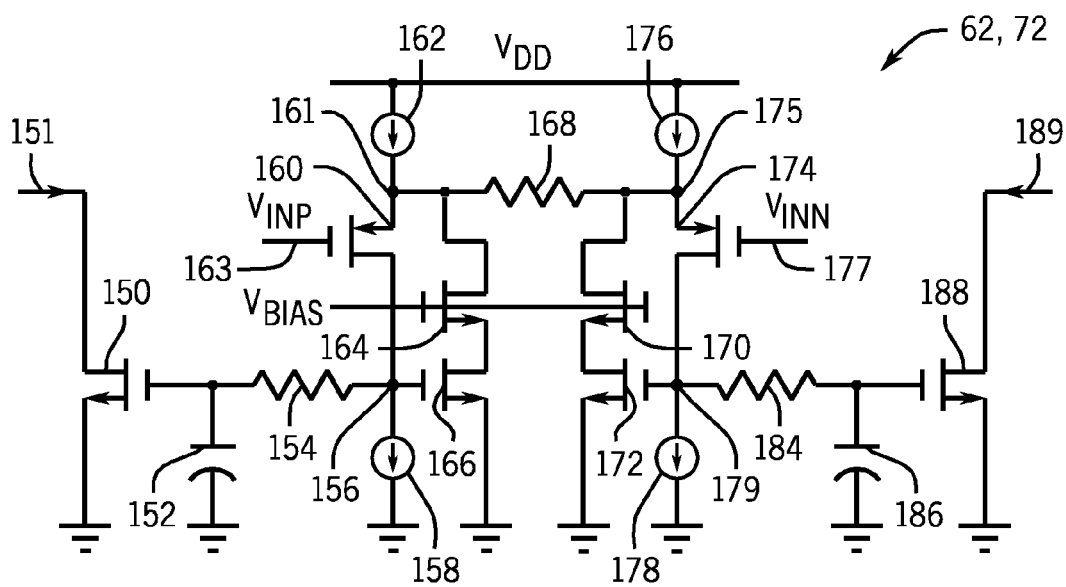
FIG. 4 is a schematic diagram of an IF amplifier of the transmitter according to an embodiment of the invention.

Referring to FIG. 4, in accordance with some embodiments of the invention, the IF transconductor 62, 72 may be a transconductance amplifier that receives a differential input signal across its input terminals 163 and 177 and provides a corresponding differential output signal at its output terminals 151 and 189. In accordance with some embodiments of the invention, the transconductor 62, 72 may have a general symmetrical design, which includes a PMOSFET 174, which has a gate terminal that serves as the input terminal 177. The source terminal of the PMOSFET 174 is coupled to a node 175, and the drain terminal of the PMOSFET 174 is coupled to a node 179. A current source 176 is coupled between the $V_{DD}$ supply voltage and the node 175, and a current sink 178 is coupled between the node 179 and ground. A low pass filter formed from a resistor 184 and a capacitor 186 is coupled between the node 179 and the gate terminal of the an n-channel metal-oxide-semiconductor field-effect-transistor (NMOSFET) 188. The NMOSFET 188 converts the voltage that is present on the node 179 into the current that flows into the output terminal 189.

In its symmetrical design, the IF transconductor 62, 72 also includes an input PMOSFET 160 that has its gate terminal that serves as the other input terminal 163. The source terminal of the PMOSFET 160 is coupled to a node 161, and the drain terminal of the PMOSFET 160 is coupled to a node 156. A current source 162 is coupled between the $V_{DD}$ supply voltage and the node 161, and a current sink 158 is coupled between the node 156 and ground. A low pass filter formed from a resistor 154 and a capacitor 152 is coupled between the node 156 and the gate terminal of an NMOSFET 150. The source terminal of the NMOSFET 150 is coupled to ground, and the drain terminal of the NMOSFET 150 is connected to receive current from the other output terminal 151.

For purposes of biasing, an NMOSFET 164 has its drain terminal coupled between the node 161 and the drain terminal of an NMOSFET 166. Similarly, an NMOSFET 170 has its drain terminal coupled to the node 175, and the source terminal of the NMOSFET 170 is coupled to the drain terminal of an NMOSFET 172. The source terminals of the NMOSFETs 166 and 172 are coupled to ground. Additionally, the gate terminals of the NMOSFETs 164 and 170 receive a bias voltage (called "$V_{BIAS}$"), and the gate terminals of the NMOSFETs 166 and 172 are coupled to the nodes 156 and 179, respectively.

Feedback between the above-described halves of the IF transconductor 62, 72 is provided by a resistor 168 that is coupled between the nodes 161 and 175. In accordance with some embodiments of the invention, the gain of the IF transconductor 62, 72 may be regulated by the MCU 42 (see FIG. 1) by adjusting the resistance of the resistor 168. Thus, the resistor 168 may be formed from a set of resistors that are selectively coupled in parallel (to form the overall resistance for the resistor 168) via switches that are controlled by the MCU 42.

It is noted that many variations and topologies are possible for the IF transconductor 62, 72, depending on the particular embodiment of the invention. Thus, the embodiment that is depicted in FIG. 4 is merely for purposes of describing one possible implementation of the IF transconductor 62, 72. Other implementations are possible and are within the scope of the appended claims.

Figure 5:
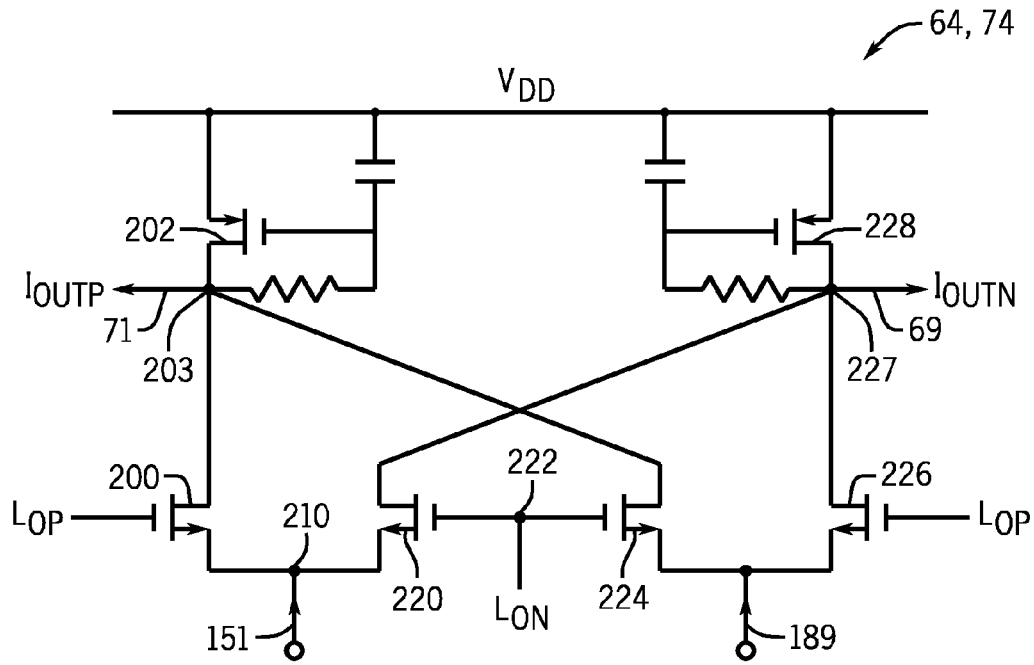
FIG. 5 is a schematic diagram of a mixer of the transmitter according to an embodiment of the invention.

Referring to FIG. 5, in accordance with some embodiments of the invention, the mixer 64, 74 may be a double balanced Gilbert cell. In this regard, the mixer 64, 74 may include an NMOSFET pair that is formed from an NMOSFET 224 and an NMOSFET 226 that have their source terminals coupled to the output terminal 189 (see FIG. 4). The drain terminal of the NMOSFET 226 may be coupled to a node 227, and the drain terminal of the NMOSFET 224 may be coupled to a node 203. The source-drain path of a PMOSFET 228 may be coupled between the $V_{DD}$ supply voltage and the node 227, and the source-drain path of a PMOSFET 202 may be coupled between the $V_{DD}$ supply voltage and the node 203. The nodes 227 and 203 provide output currents to the input terminals 69 and 71, respectively, of the LPF 76, in accordance with some embodiments of the invention.

The gate terminal of the NMOSFET 224 is coupled to a node 222 that serves as an input terminal to receive the local oscillator mixing signal. In this regard, the node 222 is also coupled to the gate terminal of an NMOSFET 220 that is part of another pair of NMOSFETs. More specifically, an NMOSFET 200 includes a gate terminal that serves as the input terminal for the local oscillator mixing signal. The source terminals of the NMOSFETs 200 and 220 are coupled together at a node 210 that sinks is coupled to the output terminal 151 (see FIG. 4). The drain terminal of the NMOSFET 220 is coupled to the node 227, and the drain terminal of the NMOSFET 200 is coupled to the node 203.

It is noted that the implementation of the mixer 64, 74 is one of many possible implementations of the mixer, as other embodiments are contemplated and are within the scope of the appended claims.

Figure 6:
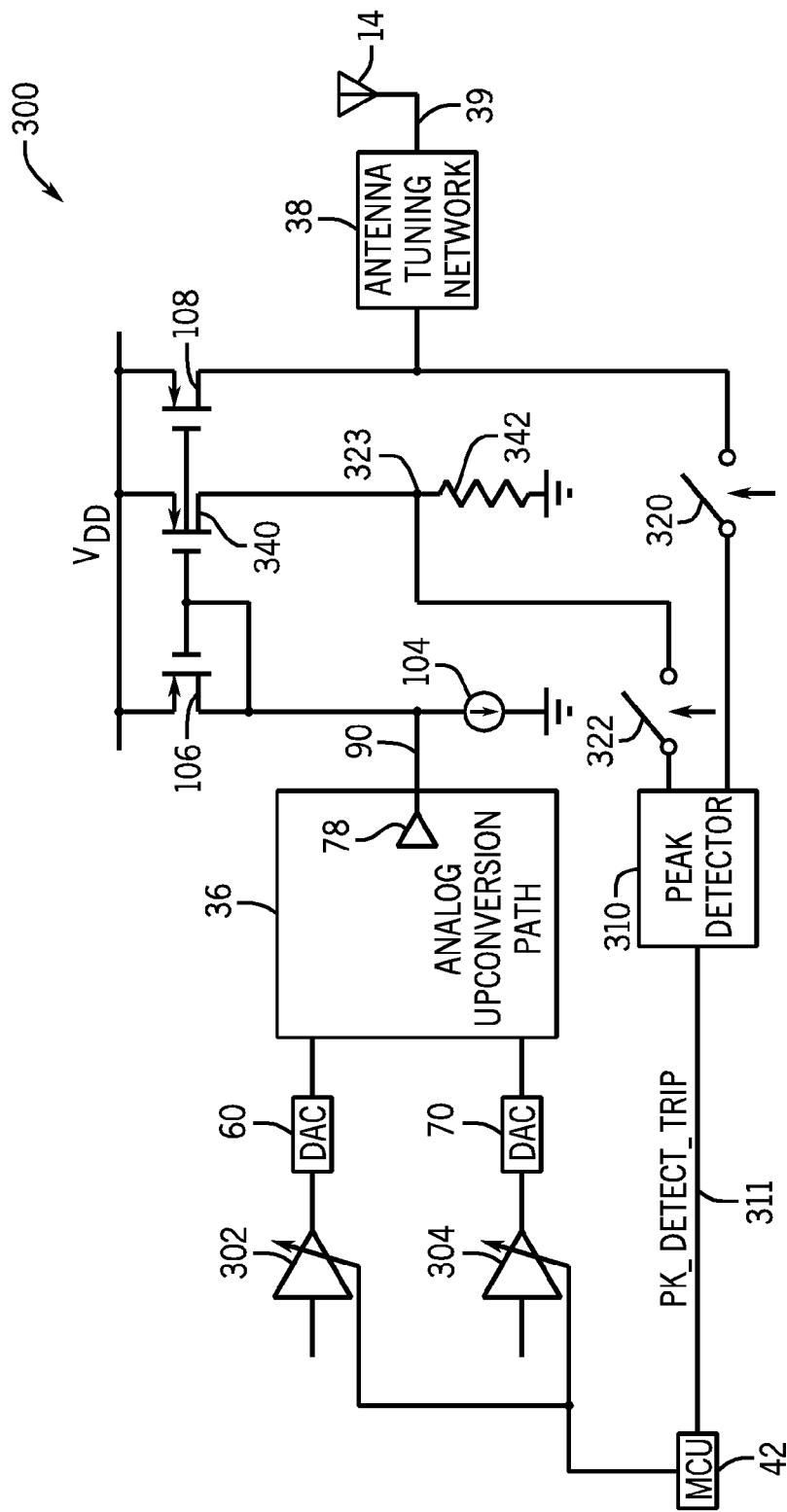
FIGS. 6, 7 and 8 are schematic diagrams of signal processing paths according to different embodiments of the invention.

Referring to FIG. 6, in accordance with some embodiments of the invention, the signal processing path 58 of FIG. 2 may be replaced by signal processing path 300. Like reference numerals are used to denote similar elements to the signal processing path 58, with the following differences. In particular, the signal processing path 300 is designed to accommodate signal swing charges due to integrated circuit process corners and/or the RF frequency of the transmitted FM signal. The current consumption of the RF transconductor 78 (see FIG. 2) and the silicon area that is occupied by the RF transconductor 78 may be minimized if the voltage signal swing range at the input terminal of the RF transconductor 78 is minimized.

In the approach depicted in FIG. 6 to minimize signal swing variations at the input terminals of the RF transconductor 78, a peak detector 310 provides an indication of the signal strength of the output signal that is provided by the RF transconductor 78, and this indication is used to regulate the magnitude of the input signal to the RF transconductor 78. More specifically, in accordance with some embodiments of the invention, a switch 322 may be closed to couple a node 323 to the input terminal of the peak detector 310. The node 323 provides a value that is indicative of the current flowing to the output tuning network 38 and may be furnished by a resistor 342 that is coupled to the drain terminal of a PMOSFET 340 that is coupled between the node 324 and the $V_{DD}$ supply voltage. The gate terminal of the PMOSFET 340. The source-drain path of the PMOSFET 340 may be coupled to the gate terminals of the PMOSFETs 108 and 106 so that the voltage across the resistor 342 is indicative of the output signal from the RF transconductor 78.

The peak detector 310, as its name implies, compares the voltage across the resistor 342 to a predetermined or programmed threshold voltage. When this threshold is exceeded, the peak detector 310 asserts a peak detect signal (called "PK_DETECT_TRIP") on its output terminal 311 for purposes of indicating the peak condition. The MCU 42 (see also FIG. 1) detects the assertion of the PK_DETECT_TRIP signal; and this detection causes the MCU 42 to undertake measures to reduce the magnitude of the signal at the RF transconductor 78 for purposes of adjusting a gain that is upstream of the RF transconductor 78.

In this regard, as depicted in FIG. 6, in accordance with some embodiments of the invention, assertion of the PK_DETECT_TRIP signal causes the MCU 42 to lower the gains of digital amplifiers 302 and 304 that are located upstream of the DACs 60 and 70. Thus, by regulating the gains of the digital amplifiers 302 and 304, the amplitude of the signal that is present at the input terminals of the RF transconductor 78 may be controlled.

Therefore, the signal processing path 300 that is depicted in FIG. 6 may be used for purposes of regulating the magnitude of the input signal to the RF transconductor 78.

The peak detector 310 may be used for purposes other than regulating the input signal to the RF transconductor 78 in accordance with some embodiments of the invention. For example, a switch 320 may be closed after an FM frequency change for purposes of monitoring the input signal to the antenna tuning network 38 to maximize the output power from the FM transmitter.

In the approach that is depicted in FIG. 6, each DAC 60, 70 may no longer operate at full scale. This may affect the signal-to-noise (SNR) of each DAC 60, 70 by as much as 12 dB (as an example). Additionally, DC offsets in the DACs, IF transconductors 62 and 72 and mixers 64 and 74 may become more important because any non-zero DC offset may be a larger fraction of the signal swing. This condition may cause significant frequency spurs to appear in the RF spectrum.

Figure 7:
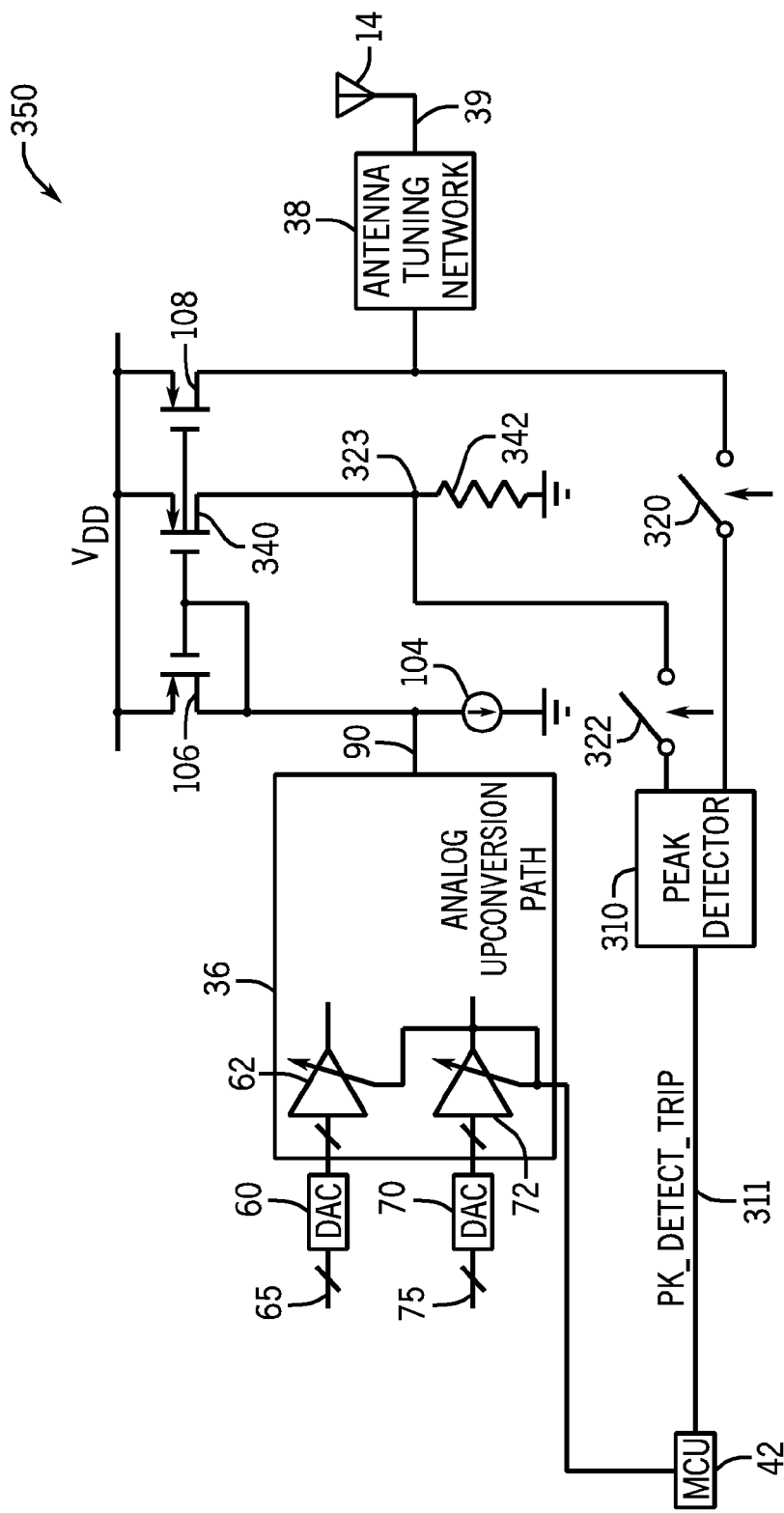

FIG. 7 depicts an alternative signal processing path 350 in accordance with other embodiments of the invention. The FM transmitter 350 has the same general design as the signal processing path 300, with like references being used to denote similar components. The signal processing paths 300 and 350 have the following differences. In particular, instead of controlling digital amplifiers to control the input signal swing of the RF transconductor 78, the MCU 42 controls the gains of the IF transconductors 62 and 72 based on the output of the peak detector 310. This approach may reduce DC offsets in the IF path. Because the output current of the IF transconductors is relatively small, however, the collective DC offset that is introduced by the IF transconductors 62 and 72 and mixers 64 and 74 may now be a relatively large fraction of the signal swing, again leading to significant spurs in the RF spectrum.

Figure 8:
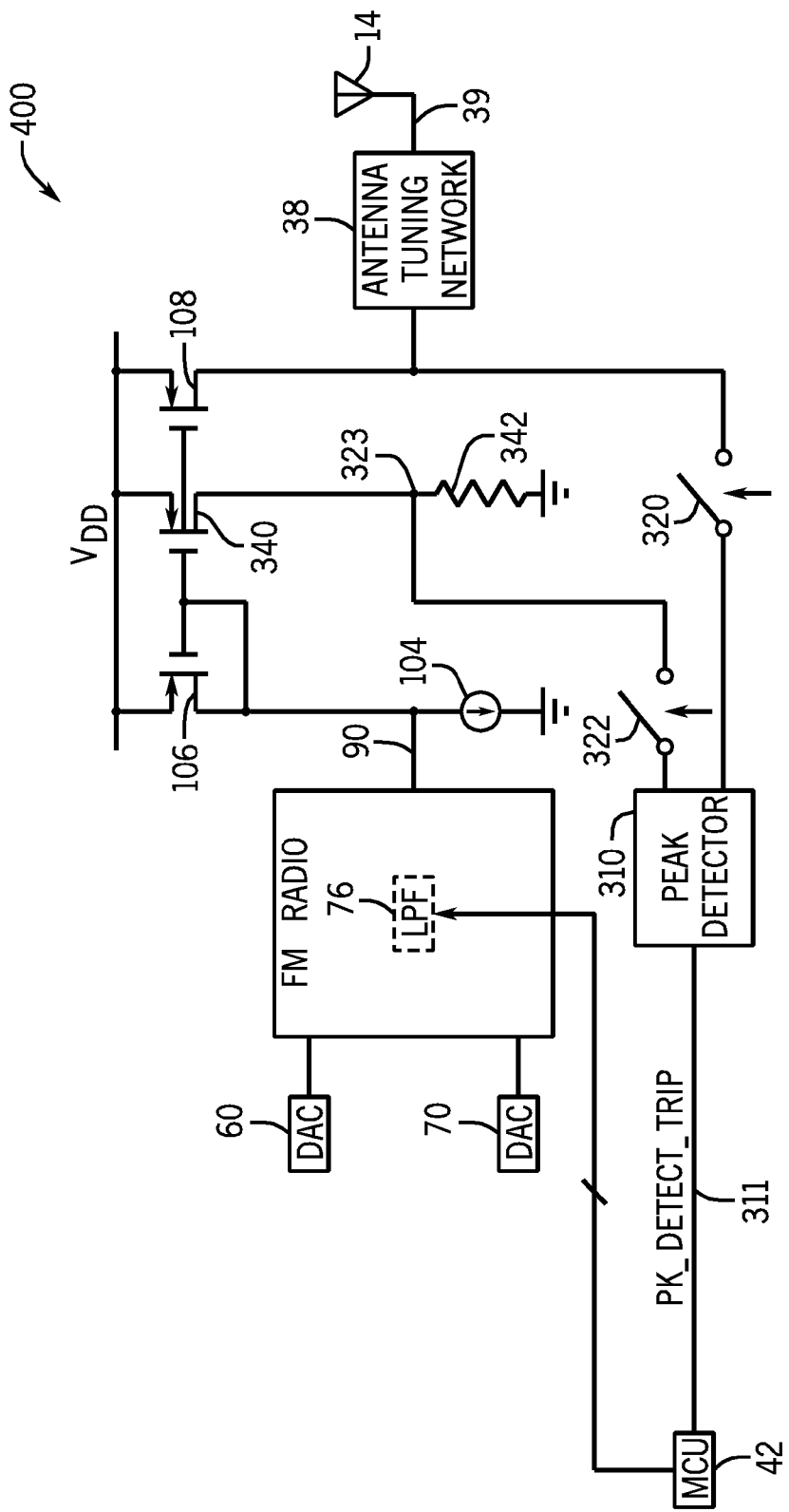

Therefore, in accordance with some embodiments of the invention, an alternative signal processing path 400 that is depicted in FIG. 8 may be used. The signal processing path 400 has a similar design to the signal processing path 300, with like reference numerals being used. The signal processing paths 300 and 400 differ as follows. In particular, instead of manipulating the gains in the digital amplifier (see FIG. 6) or the IF amplifiers (see FIG. 7) to control the magnitude of the input signal to the RF transconductor 78, the signal processing path 400 controls the gain of the LPF 76.

More specifically, the signal processing path 400 controls the signal gain downstream of the mixers 64 and 74 (see FIG. 2) and after the IF-to-RF frequency translation. Thus, in response to the assertion of the PK_DETECT_TRIP signal by the peak detector 310, the MCU 42 lowers the gain of the LPF 76 for purposes of adjusting the signal swing. In accordance with some embodiments of the invention, the MCU 42 adjusts the gain of the LPF 76 may be adjusted by changing a particular resistance or capacitor of the filter 76.

Figure 9:
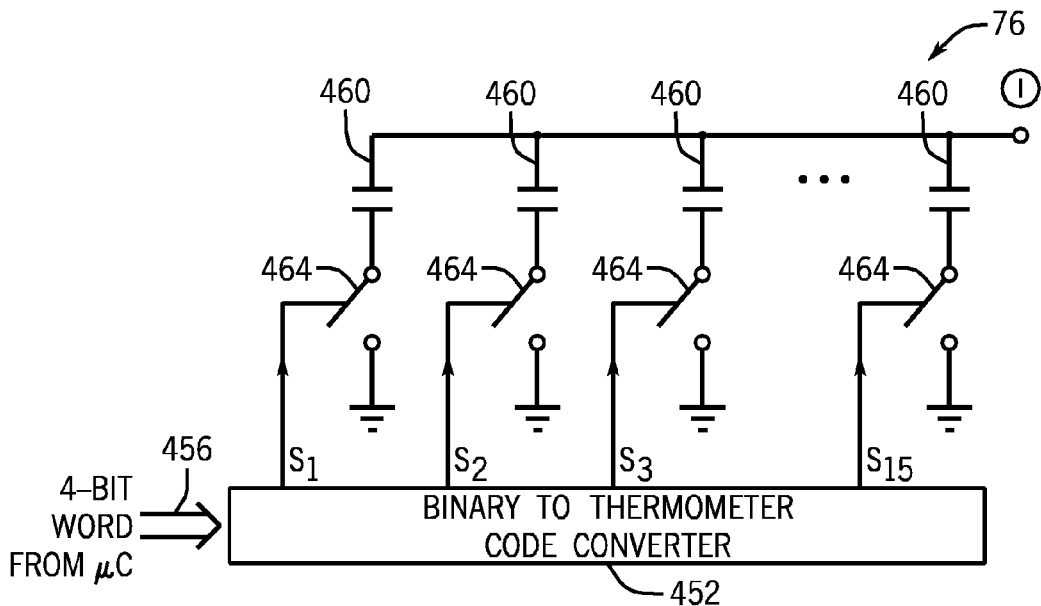
FIG. 9 is a schematic diagram of a low pass filter and associated control circuitry of the signal processing path of FIG. 8 according to an embodiment of the invention.

Referring also to FIG. 9, in embodiments of the invention in which the LPF 76 is a passive ladder-type filter, the capacitance of the first capacitors 130*a* (see FIG. 3) of the LPF 76 may be controlled by the MCU 42 to control the gain (less than unity) of the LPF 76. More specifically, the LPF 76 may include a binary-to-thermometer code converter 452 that operates switches 464 that are coupled between capacitors 460 and ground. The other terminals of the capacitors 460 are coupled together. Thus, by selectively asserting the switches 464, the MCU 42 may write information to the converter 452 for purposes of selecting the value of the capacitor 130*a* and thus, selecting the gain of the LPF 76. The capacitors 460 may be logarithmically-weighted in accordance with some embodiments of the invention; and the MCU 42 may "sweep" the capacitance value upwardly from a minimum value until the peak detector 310 trips to indicate the appropriate gain for the LPF 76.

An advantage of the above-described control using the gain of the LPF 76 is that the overall signal processing path 400 is not as sensitive to DC offsets in the signal path.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A system comprising:
   a semiconductor die;
   a cellular radio fabricated in the die to transmit and receive signals with a cellular network; and
   an FM transmitter fabricated in the die and being separate in its entirety from the cellular radio, the FM transmitter comprising:
      at least one mixer to translate an intermediate carrier frequency of an input signal to generate a second signal having an FM carrier frequency;
      a filter to remove spectral energy from the second signal to generate a third signal; and
      an antenna tuning network to produce a fourth signal to drive an antenna in response to the third signal.

2. The system of claim 1, wherein
   the input signal comprises a quadrature signal and an in-phase signal,
   said at least one mixer comprises:
      a first mixer to translate a carrier frequency of the quadrature signal to a radio frequency; and
      a second mixer to translate a carrier frequency of the in-phase signal to a radio frequency.

3. The system of claim 1, wherein the filter comprises a passive filter.

4. The system of claim 1, further comprising:
   a controller to regulate a gain of the filter in response to a magnitude of the fourth signal.

5. The system of claim 4, wherein the controller is adapted to adjust a capacitance of the filter to regulate the gain.

* * * * *